United States Patent
Kim et al.

(10) Patent No.: US 12,358,257 B2
(45) Date of Patent: Jul. 15, 2025

(54) WINDOW, METHOD FOR MANUFACTURING WINDOW, AND ELECTRONIC DEVICE HAVING THE SAME

(71) Applicant: Samsung Display Co., Ltd., Yongin-Si (KR)

(72) Inventors: Byeong-Beom Kim, Asan-si (KR); Minki Kim, Hwaseong-si (KR); Yuri Kim, Guri-si (KR); Hoikwan Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 232 days.

(21) Appl. No.: 17/091,365

(22) Filed: Nov. 6, 2020

(65) Prior Publication Data

US 2021/0260846 A1 Aug. 26, 2021

(30) Foreign Application Priority Data

Feb. 21, 2020 (KR) ........................ 10-2020-0021497

(51) Int. Cl.
*B32B 3/26* (2006.01)
*B32B 17/10* (2006.01)
(Continued)

(52) U.S. Cl.
CPC .......... *B32B 3/26* (2013.01); *B32B 17/10027* (2013.01); *B32B 17/10568* (2013.01); *B32B 17/10706* (2013.01); *B32B 17/10733* (2013.01); *B32B 17/10743* (2013.01); *C09D 7/61* (2018.01); *C09D 133/08* (2013.01); *C09D 163/00* (2013.01); *B32B 2255/26* (2013.01); *B32B 2305/72* (2013.01); *B32B 2307/536* (2013.01); *B32B 2457/20* (2013.01);
(Continued)

(58) Field of Classification Search
CPC ................. B32B 3/26; Y10T 428/1382; Y10T 428/12389; Y10T 428/2477; Y10T 428/24802; Y10T 428/24851; Y10T 428/24893; Y10T 428/24909; C09D 133/08; C09D 163/00; C09D 7/61
See application file for complete search history.

(56) References Cited

U.S. PATENT DOCUMENTS

| 9,556,064 B2 | 1/2017 | Capek et al. |
| 10,391,750 B2 | 8/2019 | Kim et al. |

(Continued)

FOREIGN PATENT DOCUMENTS

| CN | 106803401 A | * | 6/2017 | ....... G02F 1/133308 |
| CN | 110556057 A | | 12/2019 | |

(Continued)

*Primary Examiner* — Maria V Ewald
*Assistant Examiner* — Ethan Weydemeyer
(74) *Attorney, Agent, or Firm* — CANTOR COLBURN LLP

(57) ABSTRACT

A window includes a coating layer including a front surface, a rear surface, a first region having a constant distance between the front surface and the rear surface in a thickness direction, and a second region in which a distance between the front surface and the rear surface reduces in a direction away from the first region; and a bezel layer disposed on the rear surface of the coating layer, where the coating layer includes inorganic particles, an acrylate resin and an epoxy resin.

12 Claims, 10 Drawing Sheets

(51) Int. Cl.
*C09D 7/61* (2018.01)
*C09D 133/08* (2006.01)
*C09D 163/00* (2006.01)

(52) U.S. Cl.
CPC .................. *Y10T 428/12382* (2015.01); *Y10T 428/12389* (2015.01)

(56) References Cited

U.S. PATENT DOCUMENTS

| | | | |
|---|---|---|---|
| 10,563,092 B2 | 2/2020 | Kim et al. | |
| 11,245,088 B2 | 2/2022 | Kwon et al. | |
| 2015/0103271 A1* | 4/2015 | Lee | G06F 3/04164 |
| | | | 349/12 |
| 2016/0139310 A1* | 5/2016 | Lee | G02B 5/003 |
| | | | 359/584 |
| 2018/0346751 A1 | 12/2018 | Kim et al. | |
| 2018/0371196 A1 | 12/2018 | Park et al. | |
| 2019/0144332 A1 | 5/2019 | Kim et al. | |

FOREIGN PATENT DOCUMENTS

| | | |
|---|---|---|
| JP | 6396555 B2 | 9/2018 |
| JP | 201989697 A | 6/2019 |
| KR | 1020170028083 A | 3/2017 |
| KR | 1020170068823 A | 6/2017 |
| KR | 101788386 B1 | 10/2017 |
| KR | 101927271 B1 | 12/2018 |

\* cited by examiner

WINDOW, METHOD FOR MANUFACTURING WINDOW, AND ELECTRONIC DEVICE HAVING THE SAME

This application claims priority to Korean Patent Application No. 10-2020-0021497, filed on Feb. 21, 2020, and all the benefits accruing therefrom under 35 U.S.C. § 119, the content of which in its entirety is herein incorporated by reference.

BACKGROUND

The present disclosure relates to a window, a method for manufacturing a window, and an electronic device including the same.

An electronic device includes a window, a housing, and an electronic element. The electronic element may include various elements, such as display elements, touch elements, and detecting elements, which are activated in response to electronic signals.

The window protects the electronic element and provides a user with an active region. Accordingly, the user provides the electronic element with an input through the window and receives information generated by the electronic element. In addition, the electronic element may stably be protected from an external shock through the window.

Due to a slimming trend of the electronic device, the reduction of weight and thickness is desirable for the window, and in order to supplement structural weakness due to the trend, development of a window having excellent strength and surface durability has been carried out.

SUMMARY

The present disclosure provides a window capable of reduction of thickness and weight while effectively protecting an electronic device including a coating layer, components and a shape of which are controlled.

In addition, the present disclosure provides an electronic device having reduced weight and thickness and including a window including a high-hardness coating layer.

The present disclosure also provides a method for manufacturing a window including a high-hardness coating layer.

An embodiment of the inventive concept provides a window including a coating layer including a front surface, a rear surface, a first region having a constant distance between the front surface and the rear surface in a thickness direction, and a second region in which a distance between the front surface and the rear surface reduces in a direction away from the first region; and a bezel layer disposed on the rear surface of the coating layer, where the coating layer includes inorganic particles, an acrylate resin and an epoxy resin.

In an embodiment, the front surface in the first region may be flat, and the front surface in the second region may be a curved surface.

In an embodiment, the inorganic particles may be at least one among $SiO_2$, $Al_2O_3$, $TiO_2$ $Li_2O_3$, $Na_2O$, or $ZrO_2$.

In an embodiment, the inorganic particles may be included in the coating layer in an amount of about 1-10 percentages by weight (wt %) with respect to the coating layer.

In an embodiment, the constant distance between the front surface and the rear surface in the first region may be about 10-1,000 micrometers (μm).

In an embodiment, the coating layer may have a pencil hardness of about 6 hardness (H) to 9H.

In an embodiment, the window may further include a glass layer disposed between the bezel layer and the coating layer.

In an embodiment, a thickness of the glass layer may be about 10-300 μm, and the constant distance in the first region of the coating layer may be about 10-700 μm.

In an embodiment, the window may further include a functional layer disposed on the bezel layer, and the functional layer may have a repeated pattern having a shape of a hair line, a lattice, or a polygon.

In an embodiment of the inventive concept, an electronic device includes an electronic panel including a display region parallel to a plane defined by a first direction and a second direction crossing the first direction and a non-display region surrounding the display region; and a window disposed on the electronic panel, where the window includes a coating layer comprising a first region parallel to the plane and overlapping the display region in a plan view, and a second region overlapping the non-display region and having an outer, curved surface; and a bezel layer disposed in the second region, where the coating layer includes inorganic particles, an acrylate resin, and an epoxy resin.

In an embodiment, the first region may have a constant thickness in a direction perpendicular to the plane, and the second region may have a thickness which gradually decreases toward the first direction or the second direction.

In an embodiment, a thickness of the first region may be about 10-1,000 μm in the direction perpendicular to the plane.

In an embodiment, the window may further include a glass layer disposed between the coating layer and the bezel layer, where a thickness of the glass layer in the direction perpendicular to the plane may be about 10-300 μm.

In an embodiment, the window may further include a functional layer disposed on the bezel layer, where the functional layer may have a repeated pattern having a shape of a hairline, a lattice, or a polygon.

In an embodiment of the inventive concept, a method for manufacturing a window includes preparing a coating composition; applying the coating composition, and curing the applied coating composition to form a coating layer, where the coating composition includes about 1-10 wt % of inorganic particles, an acrylate resin, and an epoxy resin.

In an embodiment, the coating composition may further include a photoinitiator.

In an embodiment, in the applying of the coating composition, the coating composition may be applied such that a thickness of the coating composition may be about 10-1,000 μm.

In an embodiment, the method may further include arranging a glass layer having a thickness of about 10-300 μm before the preparing of the coating composition.

In an embodiment, in the curing of the applied composition to form the coating layer, a heat of about 120-180 degrees Celsius (° C.) may be provided for about 20 minutes.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
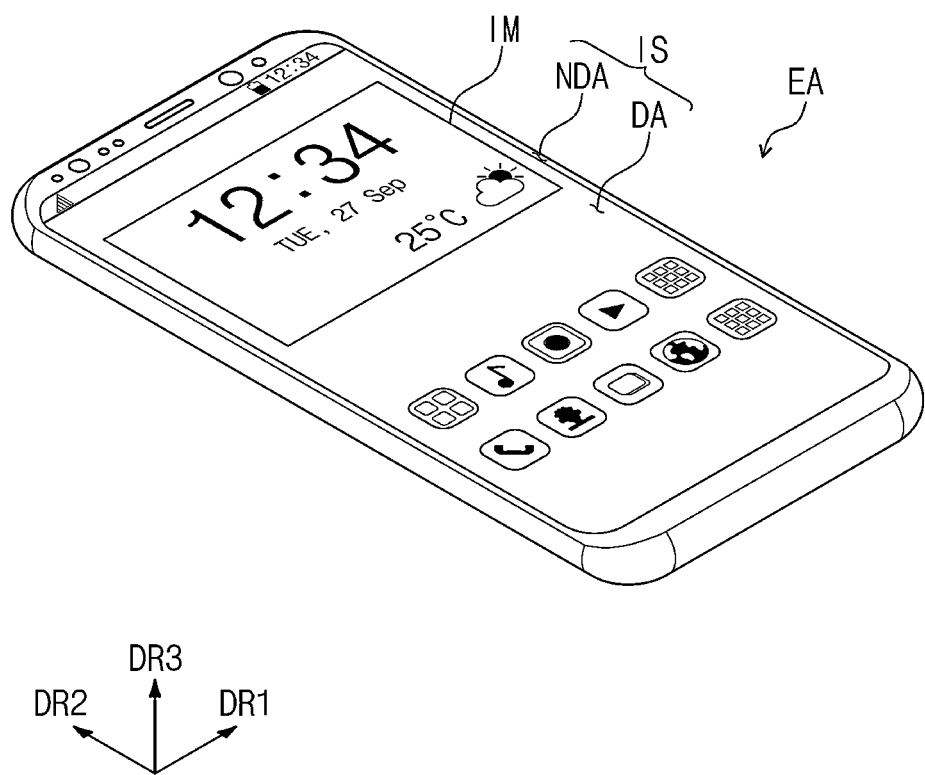
FIG. 1 is a perspective view of an electronic device according to an exemplary embodiment.

The present invention may be modified in many various forms, and thus preferred embodiments are illustrated in the drawings and are described in the detailed description of the invention. However, this does not limit the present invention within specific embodiments and it should be understood that the present invention covers all the modifications, equivalents, and replacements within the idea and technical scope of the present invention.

In this specification, it will be understood that when an element (or a region, a layer, portion, etc.) is referred to as being "on", "connected to" or "coupled to" another element or layer, it can be directly on, connected or coupled to the other element or layer or a third intervening element may be present.

The wording, "directly disposed" may mean a case in which there is no layer, a film, a region, or a plate provided between the portion of the layer, film, region, or plate and other portions. For example, the wording "directly disposed" may mean a case in which two layers or two members are disposed without an additional member such as an adhesive member used therebetween.

Like reference numerals refers to like elements. Also, in the figures, the thicknesses, ratios, and dimensions of components are exaggerated for effective illustration of technological contents.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or" includes all of one or more combinations that can be defined by associated items.

It will be understood that although the terms such as "first, and "second" are used herein to describe various elements, these elements should not be limited by these terms. The terms are only used to distinguish one component from other components. For example, a first element may be referred to as a second element and the second element may similarly be referred to as the first element without departing from the scope of the present invention. A singular expression may include a plural expression unless clearly defined otherwise in context.

In addition, terms such as "on a rear surface", "under", "below", "on a front surface", "over", "above", and the like may be used to describe the correlation between features illustrated in the figures. The terms have relative concept, and are described on the basis of the orientation illustrated in the figures. In this specification, the term "disposed on" may mean not only the case of being disposed on an upper portion of any one member but also the case of being on a lower portion thereof.

Unless defined otherwise, all the terms (including technical terms and scientific terms) used in this specification has the same meaning as those understood generally by those skilled in the art to which the present invention belongs. In addition, it will be further understood that terms, such as those defined in commonly used dictionaries, should be interpreted as having a meaning that is consistent with their meaning in the context of the relevant art and will be interpreted as being defined herein unless interpreted in an idealized or excessively formal sense.

It will be further understood that the terms "includes" or "has", when used in this specification, specify the presence of stated features, numbers, steps, operations, elements, components or combinations thereof, but do not preclude the presence or addition of one or more other features, numbers, steps, operations, elements, components, and/or combinations thereof.

Hereinafter, a method for manufacturing a window according to an embodiment of the inventive concept will be described with reference to drawings.

Figure 2:
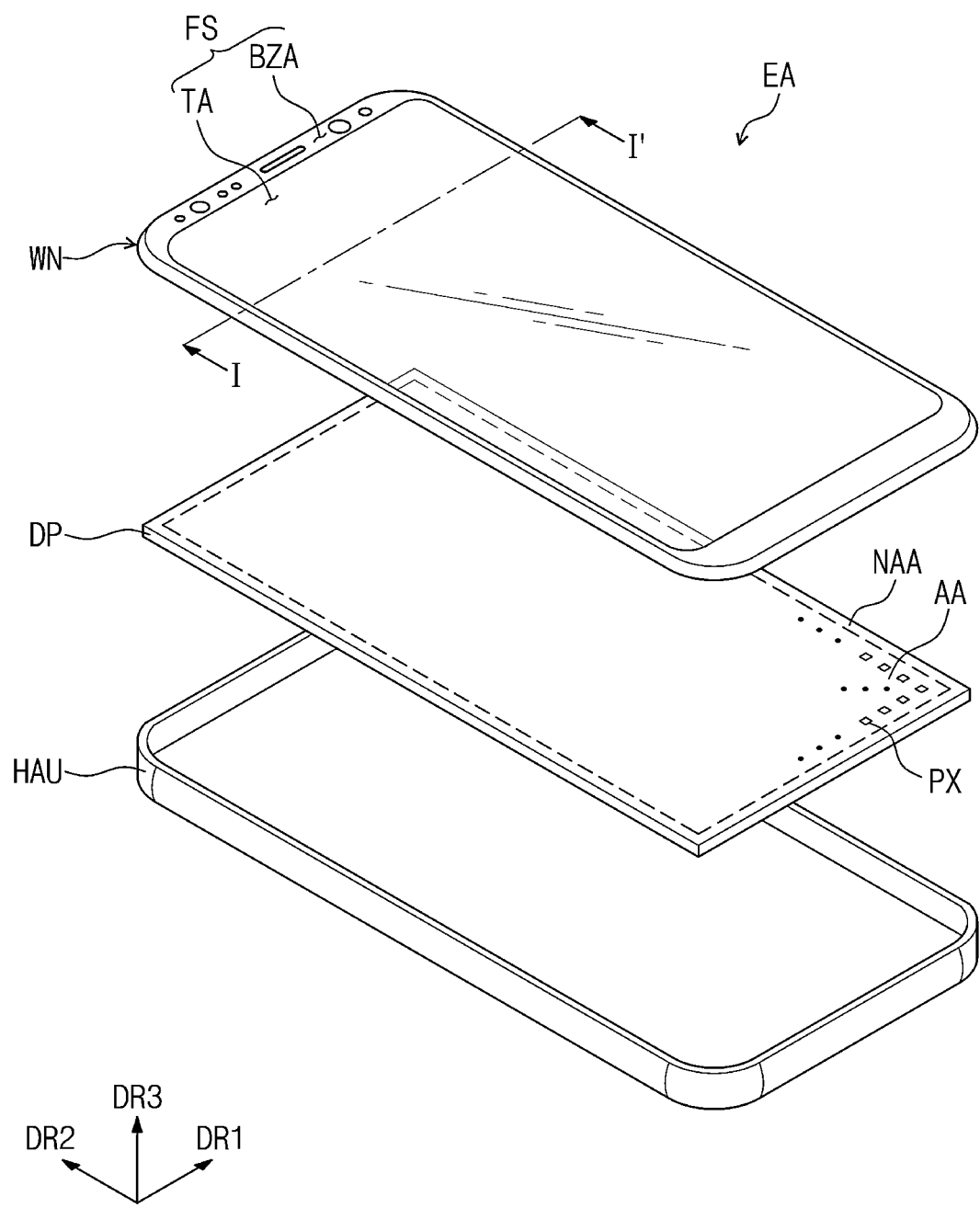
FIG. 2 is an exploded perspective view of an electronic device illustrated in FIG. 1.

Hereinafter, embodiments of the inventive concept will be described with reference to the accompanying drawings. FIG. 1 is a perspective view illustrating an electronic device. FIG. 1 is a perspective view illustrating one exemplary embodiment of an electronic device including a window. FIG. 2 is an exploded perspective view of the electronic device illustrated in FIG. 1.

An electronic device EA may be an apparatus activated in response to an electric signal. The electronic device EA may include various exemplary embodiments. For example, the electronic device EA may include a tablet PC, a laptop PC, a computer, a smart television, etc. Hereinafter, the electronic device EA is exemplarily illustrated as a smartphone.

The electronic device EA may display an image IM in a third direction DR3 on a display surface IS which is parallel to a plane defined by a first direction DR1 and a second direction DR2. The display surface IS on which the image IM is displayed may correspond to the front surface of the electronic device EA and correspond to the upper surface FS of a window WN. In addition, the electronic device EA may have a solid shape having a predetermined thickness in a third direction DR3 perpendicular to the plane defined by the first direction DR1 and the second direction DR2.

In the electronic device EA of the embodiment illustrated in FIG. 1, the display surface IS may include a display region DA and a non-display region NDA adjacent to the display region DA. The non-display region NDA may be disposed surrounding the display region DA. However, the embodiment of the inventive concept is not limited thereto, and the shapes of the display region DA and the non-display region NDA may be designed relatively.

The display region DA may be a portion to which an image IM is provided and be a portion corresponding to an active region AA of an electronic panel DP. Meanwhile, FIG. 1 illustrates that a static image is included as an example of the image IM, but a dynamic image may also be included.

In this embodiment, the front surface (i.e., upper surface) and the rear surface (i.e., lower surface) of each of members are defined with respect to the direction (i.e., the third direction DR3) in which the image IM is displayed. Here, the image IM is displayed on the front surface. The front surface and the rear surface may oppose each other in the third direction DR3. A normal direction of each of the front surface and the rear surface may be parallel to the third direction DR3. The directions indicated by the first to third directions DR1, DR2 and DR3 have relative concepts and, therefore, may be converted into other directions on a condition that the relative positions of axes of the first to third directions DR1, DR2, and DR3 are kept. Hereinafter, the first to third directions correspond to directions respectively indicated by the first to third directions DR1, DR2 and DR3, and are referred by the same reference symbols.

The electronic device EA includes a window WN, an electronic panel DP, and a housing HAU. In the electronic device EA according to an exemplary embodiment illustrated in FIGS. 1 and 2, the window WN and the housing HAU are coupled and may constitute the external appearance of the electronic device EA.

As described above, the front surface FS of the window WN defines the front surface of the electronic device EA. The front surface FS of the window WN may include a transmissive region TA and a bezel region BZA.

The transmissive region TA may be an optically transparent region. For example, the transmissive region TA may be a region having a visible light transmittance of at least about 90 percentages (%).

The bezel region BZA may be a region having a relatively lower light transmittance than the transmissive region TA. The bezel region BZA may define the shape of the transmissive region TA. The bezel region BZA may be adjacent to the transmissive region TA and surround the transmissive region TA. However, the embodiment of the inventive concept is not limited thereto, and the shape of the bezel region BZA and the shape of the transmissive region TA may be relatively designed.

The bezel region BZA may have a predetermined color. The bezel region BZA may cover a peripheral region NAA of the electronic panel DP and prevent the peripheral region NAA from being viewed from the outside. At least a portion of the bezel region BZA may have a shape of a curved surface.

The window WN of the exemplary embodiment includes a coating layer and may stably protect the electronic panel DP from an external shock. A detailed description about the window WN will be described later.

The electronic panel DP may be activated in response to an electronic signal. In this embodiment, the electronic panel DP is activated and displays an image IM on the display surface IS of the electronic device EA. The image IM is provided visible to a user through the transmissive region TA, and the user may see information through the image IM. However, this is exemplarily illustrated, and the electronic panel DP is activated and may also detect an external input applied to an upper surface thereof in another embodiment. For example, the external input may include a touch of a user, a contact or an approach of a shapeless object, a pressure, light, or heat, and is not limited to any one embodiment.

The electronic panel DP may include an active region AA and a peripheral region NAA. The active region AA may be a region which provides an image IM. The transmissive region TA may overlap at least a portion of the active region AA in the third direction DR3 (i.e., a plan view).

The peripheral region NAA is adjacent to the active region AA. The peripheral region NAA may surround the active region AA. A driving circuit, a driving wiring, and the like for driving the active region AA may be disposed in the peripheral region NAA.

The electronic panel DP may include a plurality of pixels PX. The pixels PX respond to electronic signals and emit light. The lights emitted by the pixels PX implement an image IM. The pixels PX may include a display element. For example, the display element may be an organic light-emitting element, a quantum dot light-emitting element, a liquid crystal capacitor, an electrophoretic element, an electrowetting element, or the like.

The housing HAU may be disposed below the electronic panel DP. The housing HAU may include a material having a relatively high stiffness (i.e., relatively high rigidity). For example, the housing HAU may include a plurality of frames and/or plates composed of or including glass, plastic, or metal. The housing HAU may provide a predetermined accommodation space. The electronic panel DP may be accommodated inside the accommodation space of the housing HAU and be protected from an external shock.

Figure 3A:
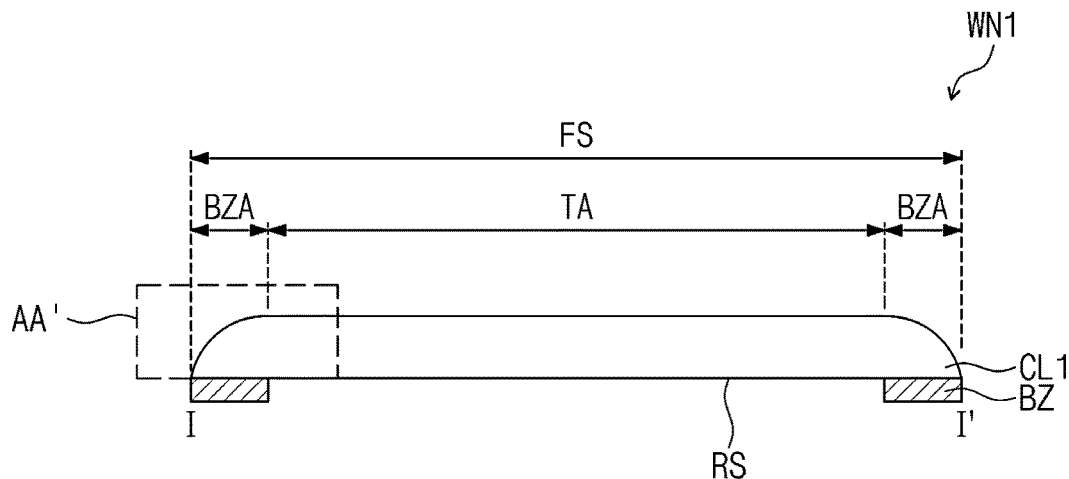
FIGS. 3A to 3C are cross-sectional views of a window according to an exemplary embodiment.
Figure 3B:
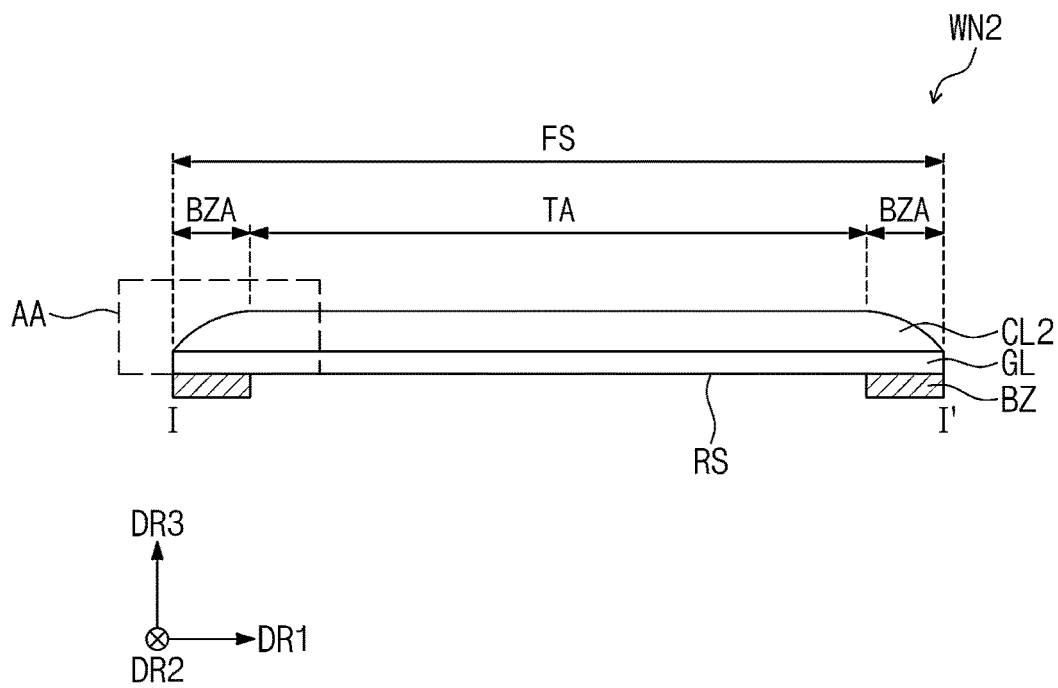
Figure 3C:
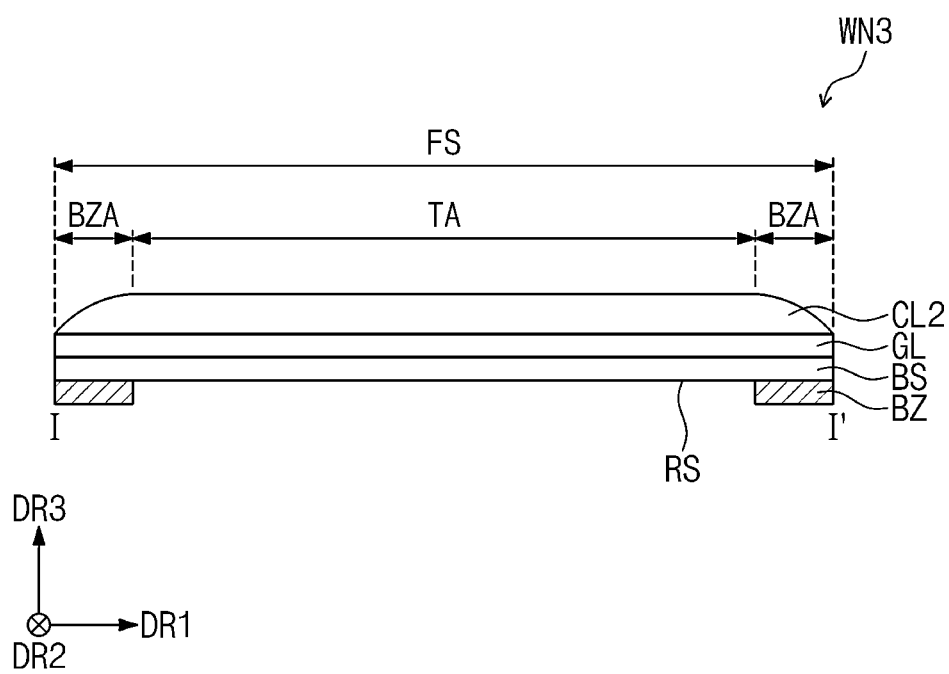
Figure 4A:
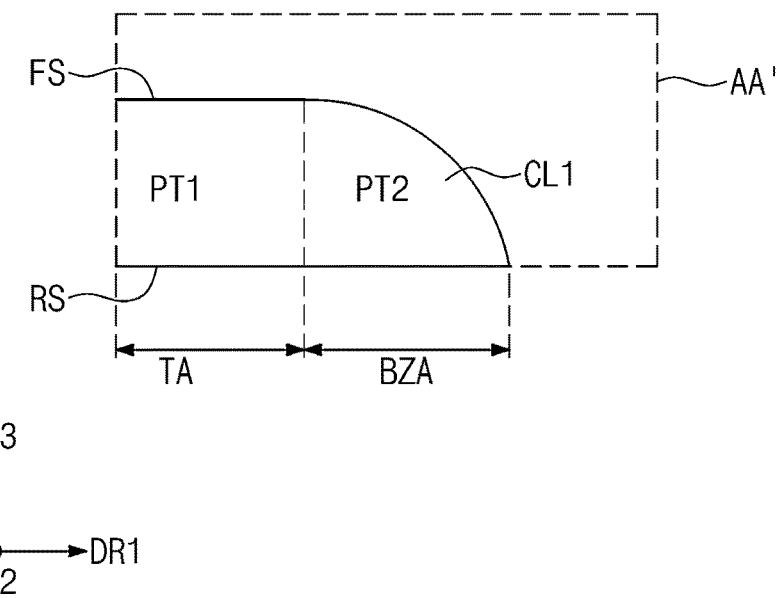
FIG. 4A is an exploded view illustrating portion AA' of FIG. 3A.
Figure 4B:
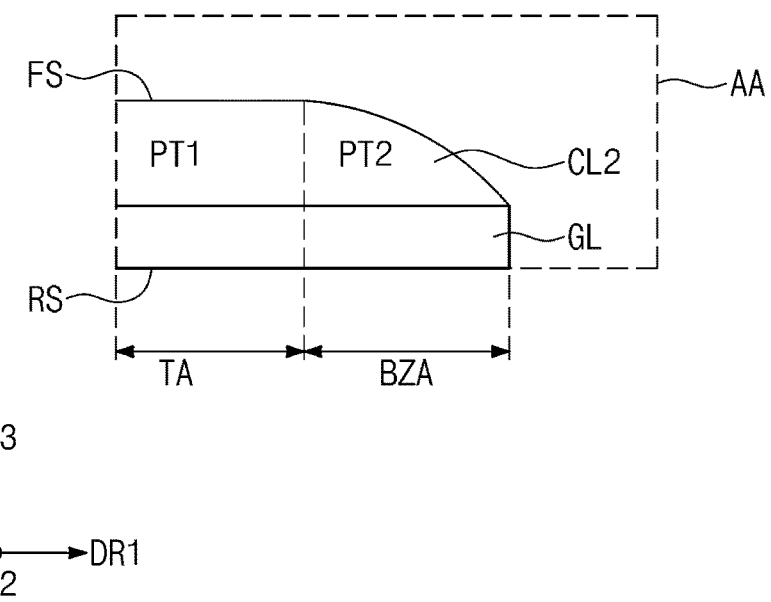
FIG. 4B is an exploded view of portion AA of FIG. 3B.

FIG. 3A is a cross-sectional view of a window WN1 according to an exemplary embodiment, taken along line I-I' of FIG. 2, and FIG. 4A is an expanded view of portion AA' of FIG. 3A. FIG. 3B is a cross-sectional view of a window WN2 in another exemplary embodiment, and FIG. 4B is an expanded view of portion AA of FIG. 3B. FIG. 3C is a cross-sectional view of a window WN3 in still another exemplary embodiment.

FIGS. 3A to 3C exemplarily illustrate cross-sections of a windows WN1, WN2 and WN3 cut in the first direction DR1, but cross-sections of the window WN1, WN2 and WN3 cut in the second direction DR2 may also have the substantially the same shape.

In the exemplary embodiments, each of the windows WN1, WN2 and WN3 include bezel layers BZ and a coating layer CL1 or CL2 which are sequentially disposed. Each of the windows WN1, WN2 and WN3 may include the coating layer CL1 or CL2 (e.g., the window WN1 includes the coating layer CL1, and each of the windows WN2 and WN3 includes the coating layer CL2) and stably protect the electronic panel DP from an external shock.

The front surfaces FS of the coating layers CL1 and CL2 expose to the outside of the electronic device EA, and define the front surface FS of the window WN1 and the front surface of the electronic device EA. The rear surfaces RS of the coating layers CL1 and CL2 oppose the front surface FS in the third direction DR3. The front surfaces of the coating layers CL1 and CL2 may be flat surfaces. The shapes of the coating layers CL1 and CL2 will be described in detail in FIGS. 4A and 4B.

The coating layers CL1 and CL2 each include inorganic particles, an acrylate resin, and an epoxy resin. The coating layers CL1 and CL2 may ensure excellent hardness and strength by mixing the above materials. The inorganic particles included in the coating layer CL1 or CL2 may be at least one of $SiO_2$, $Al_2O_3$, $TiO_2$, $Li_2O_3$, $Na_2O$, and $ZrO_2$. The inorganic particles may be included in a weight percent of about 1-10% with respect to the coating layer CL1 or CL2.

The coating layer CL1 or CL2 may have a hardness corresponding to a pencil hardness of about 6 hardness (H) to 9H. The pencil hardness may be a concentration symbol of a pencil which is the hardest pencil with which the surface of the coating layer CL1 or CL2 is not damaged when scraping the surface of the coating layer CL1 or CL2 with the pencil at an angle of about 45 degrees while a predetermined load is applied to the pencil. For instance, the predetermined load may be about 0.75 kilograms (Kg). When the pencil hardness of the coating layer CL1 or CL2 is less than about 6H, it is unable to secure durability for enduring an external force, and it is difficult to protect the electronic panel DP. On the other hand, when the pencil hardness of the coating layer CL1 or CL2 exceeds about 9H, the flexibility of the coating layer CL1 or CL2 is not secured, and a crack may easily occur when an external force is applied to the coating layer CL1 or CL2.

In another exemplary embodiment of FIG. 3B, the window WN2 may further include a glass layer GL disposed between the coating layer CL2 and the bezel layer BZ compared to the embodiment of FIG. 3A. The glass layer GL may be flat.

The glass layer GL is not particularly limited as long as having light transmittance. The thickness of the glass layer GL in the third direction DR3 may be about 10-300 micrometers (μm). When the thickness of the glass layer GL satisfies the above range, the glass layer GL may have excellent hardness while securing an appropriate hardness and thus may effectively protect the electronic panel DP. Thereby, the size and weight of the electronic device EA may be reduced.

The bezel layer BZ is disposed on the rear surface RS of the coating layer CL1 or rear surface of the glass layer GL and defines a bezel region BZA. The bezel layer BZ has a relatively lower light transmittance than the coating layer CL1, CL2 and the glass layer GL. For example, the bezel layer BZ may have a predetermined color. Accordingly, the bezel layer BZ may selectively transmit/reflect only the light of a specified color. Alternatively, for example, the bezel layer BZ may also be a light blocking layer for absorbing incident light. The color of the bezel region BZA may be determined according to the light transmittance of the bezel layer BZ.

The bezel layer BZ may be disposed on the rear surface RS of the coating layer CL1 or the rear surface of the glass layer GL. The bezel layer BZ may be directly formed on the rear surface RS of the coating layer CL1 or the rear surface of the glass layer GL. Alternatively, the bezel layer BZ may also be coupled to the rear surface RS of the coating layer CL1 or the rear surface of the glass layer GL via a separate adhesive member or the like. The method for forming the bezel layer BZ is not particularly limited, and for example, may be formed through printing or deposition.

In another exemplary embodiment of FIG. 3C, the window WN3 may further include a base layer BS compared to the embodiments of FIGS. 3A and 3B. The base layer BS may be a transparent substrate that can be generally used, or a functional layer that can perform a particular function. In an embodiment, the base layer BS may be a pattern layer having a repeated pattern of hairlines, lattices, polygonal shapes, or the like. The base layer BS may be disposed between the coating layer CL2 and the bezel layer BZ. When the window WN3 includes the base layer BS, the bezel layer BZ may be directly coupled to the rear surface of the base layer BS or indirectly coupled to the rear surface of the base layer BS via a separate adhesive member or the like.

Referring to FIGS. 4A and 4B, the coating layers CL1 and CL2 may each include a first region PT1 and a second region PT2. In this specification, the thickness (or distance) of each of a first region PT1 and a second region PT2 may be defined as the length measured from the front surface FS to the rear surface RS in the direction parallel to the third direction DR3.

The first region PT1 has the constant distance (i.e., thickness) between the front surface FS and the rear surface RS. The front surface FS and the rear surface RS of the first region PT1 may be flat. The distance between the front surface FS and the rear surface RS of the first region PT1 may be about 10-1,000 μm. In another exemplary embodiment, the distance between the front surface FS and the rear surface RS of the first region PT1 may be about 10-800 μm, about 10-500 μm, or about 10-100 μm. When the first region PT1 satisfies the above distance, the electronic device EA may effectively be protected by securing appropriate strength and thickness. For example, when there is no glass layer GL on the window as in FIG. 4A, the coating layer CL1 may have the larger thickness than the case in which a glass layer GL is present as in FIG. 4B.

The second region PT2 has the thickness that is different according to a distance from the first region PT1 in the first direction DR1. The second region PT2 has the distance (i.e., the thickness in the third direction DR3) which is between the front surface FS and the rear surface RS and which gradually decreases in a direction away from the first region PT1. The rear surface RS of the second region PT2 is flat, but the front surface FS of the second region PT2 may be a curved surface. The radius of curvature of the curved surface of the second region PT2 may vary according to the thickness in the third direction DR3 that the first region PT1 has. For example, when there is no glass layer GL on the window WN1 as in FIG. 4A, the coating layer CL1 may have a larger radius of curvature than the case in which a glass layer GL is present as in FIG. 4B.

Figure 5A:
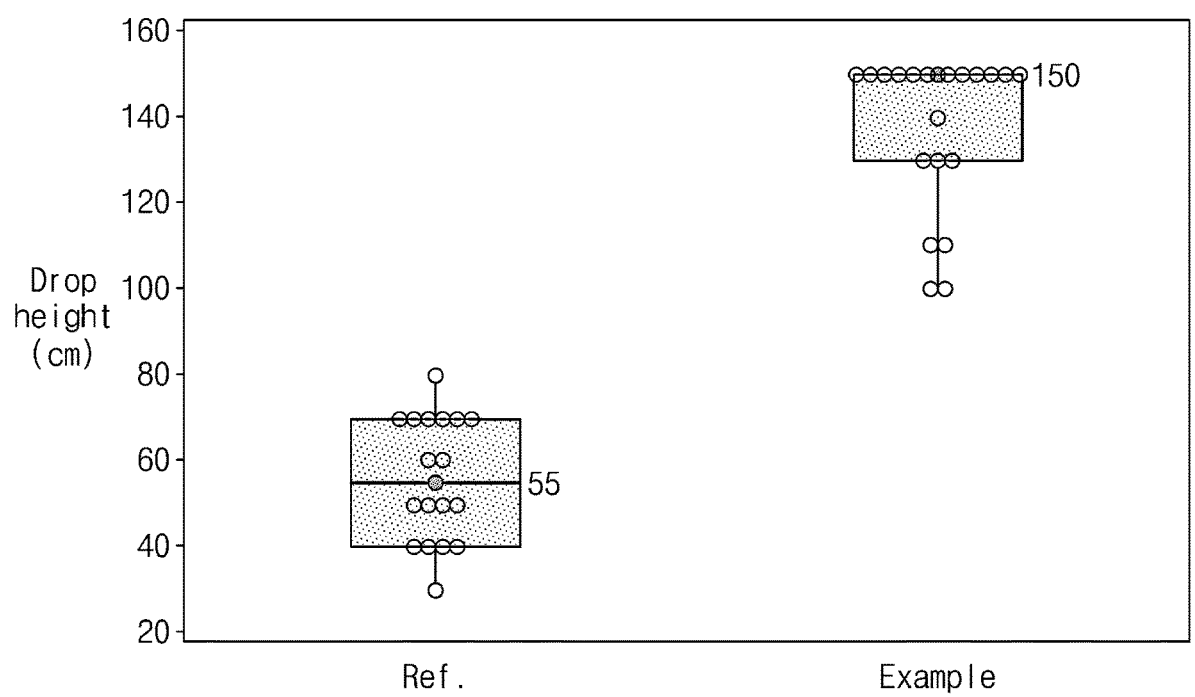
FIG. 5A is graph comparing and illustrating fracture strengths of windows in one example and a comparative example.
Figure 5B:
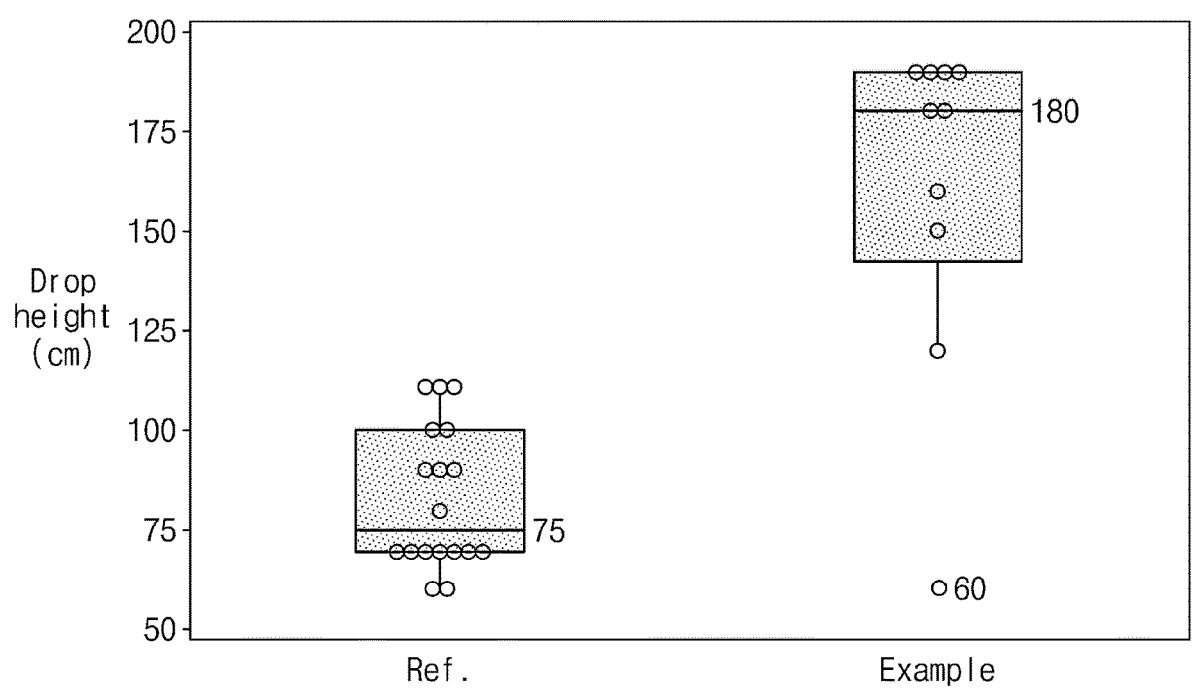
FIG. 5B is graph comparing and illustrating fracture strengths of windows in one example and a comparative example.

FIGS. 5A and 5B are graphs comparing and illustrating fracture strengths of windows in one example and a comparative example. The windows of the comparative example Ref of FIGS. 5A and 5B do not include a coating layer and includes only a glass layer having a thickness of about 500 μm, and the window of the example Example includes a glass layer having a thickness of about 300 μm and a coating layer having a thickness of about 100 μm as in FIG. 3B.

FIG. 5A compares and illustrates ball drop test ("BDT") fracture strengths. The BDT fracture strengths were evaluated by a ball drop test (BDT) method. Test target windows were each disposed on a predetermined-size circular ring (a ring having an outermost diameter of about 35 mm, and an innermost diameter of about 25 mm), and the height from which a test probe is dropped when the windows were broken were measured as the drop heights (centimeters: cm) while the test target windows were each brought into contact with a test probe having a spherical shape and a diameter of about 10 mm, and a load was applied.

Referring to the result of FIG. 5A, a fracture occurred at about 55 cm in the comparative example Ref, and a fracture occurred at about 150 cm in the example Example. That is, it may be confirmed that the window in the example Example including a coating layer has an improved strength characteristic compared to the comparative example Ref.

FIG. 5B illustrates a drop test result. The resultant measurement of FIG. 5B was performed using an electronic device mock-up including a window. The drop test was performed by dropping the electronic device mock-up to a granite substrate and confirming whether a fracture occurred. The measurement value illustrated in FIG. 5B illustrates the maximum drop height at which the window was broken when dropping the electronic device mock-up.

Referring to the result of FIG. 5B, the average drop height in the comparative example Ref was measured as about 75 cm, and the average drop height in the example Example was measured as about 180 cm. That is, it may be confirmed that the window in the example Example includes a coating layer and has a shock resistance improved by about 2.4 times compared to the compared example Ref.

Figure 6:
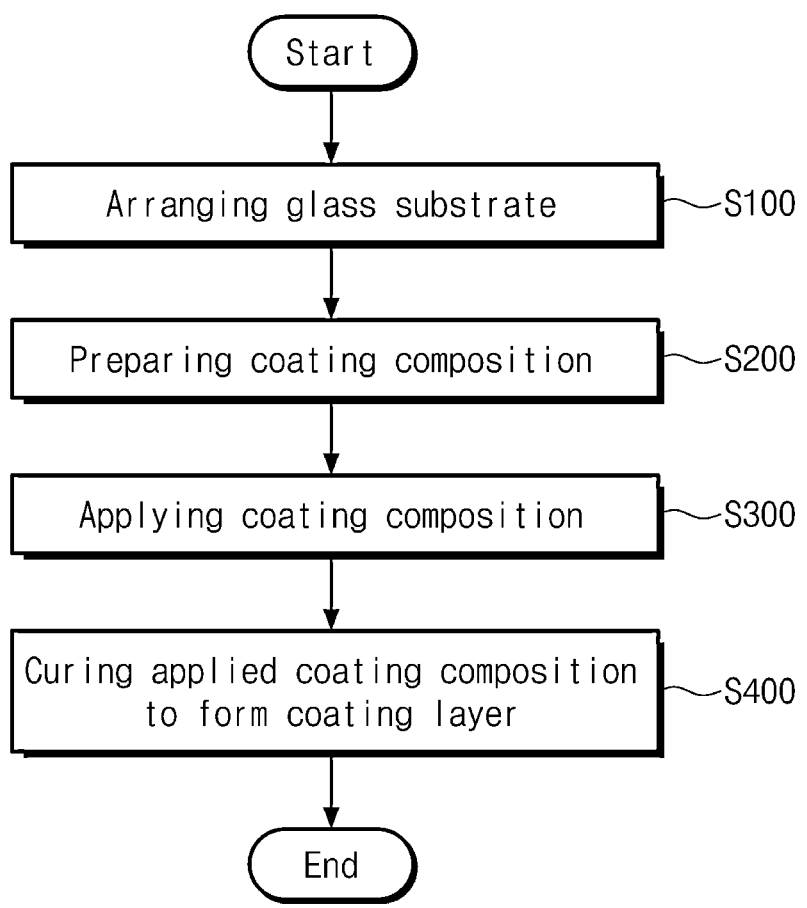
FIG. 6 is a flowchart illustrating a method for manufacturing a window according to an exemplary embodiment.

FIG. 6 is a flowchart schematically illustrating a window manufacturing method according to an exemplary embodiment. FIGS. 7A to 7D are cross-sectional views schematically illustrating steps of the window manufacturing method of the exemplary embodiment. Regarding the window, the window manufacturing method in the exemplary embodiment includes: a step S200 of preparing a coating composition CP: a step S300 of applying the coating composition CP; and a step S400 of curing the applied coating composition CP to form a coating layer.

The step S200 of preparing a coating composition CP may be a step of mixing an acrylate resin and an epoxy resin. Inorganic particles may be included in an amount of about 1-10 percentages by weight (wt %). In addition, the coating composition CP may further include an initiator considering a post-curing reaction. The types of the initiators are not particularly limited as long as being capable of promoting a curing reaction, and may be, for example, a photoinitiator.

In the exemplary embodiment, the method for manufacturing a window may include a step S100 of arranging a glass substrate before the step S200 of preparing the coating composition CP. When the window includes a glass layer GL, the glass layer GL may be disposed before applying a coating composition CP as in FIG. 7A.

Figure 7A:
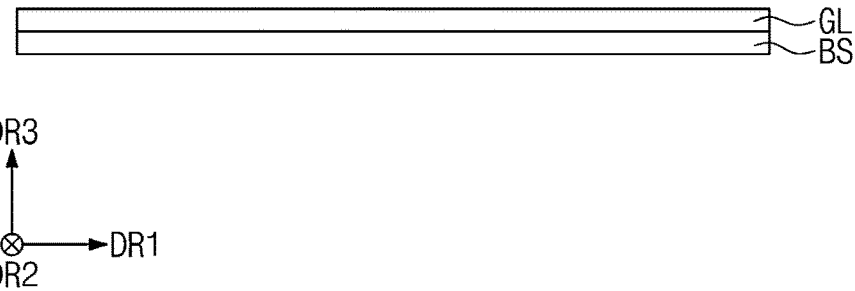
FIGS. 7A to 7D are cross-sectional views schematically illustrating a method for manufacturing a display module according to an embodiment of the inventive concept.
Figure 7B:
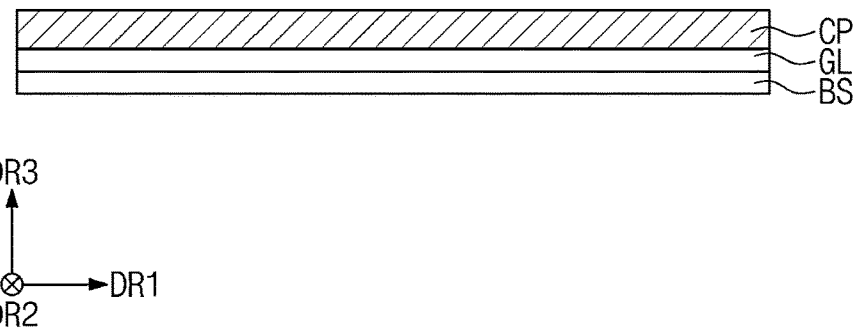

Referring to FIG. 7B, the step S300 of applying a coating composition CP may be a step of applying the coating composition CP such that a coating layer CL has a constant thickness on a base layer BS or the glass layer GL, for example, the thickness of the coating layer CL is 10-1,000 μm. The method for applying the coating composition CP is not particularly limited, and a method such as a vacuum deposition method, a spin coating method, a cast method, a Langmuir-Blodgett ("LB") method, an inkjet printing method, a laser printing method, and a laser induced thermal imaging ("LITI") method may be used.

Figure 7C:
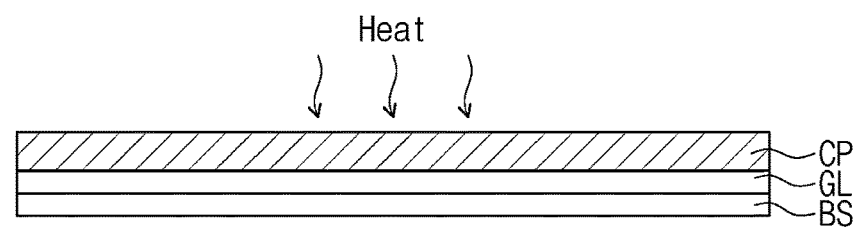

Referring to FIG. 7C, the step S400 of curing the applied coating composition CP to form a coating layer CL may be a step of providing constant energy to form the coating layer CL. In the step of providing energy to the applied coating composition CP and curing the applied coating composition CP, an acrylate resin may be contracted, and an epoxy resin may expand. Appropriate hardness and strength of the coating layer CL are simultaneously satisfied while two materials having such opposing properties form one layer, such that the mechanical characteristic of the window may be secured.

In FIG. 7C, the energy provided to the coating composition CP is illustrated as heat, but the embodiment of the inventive concept is not limited thereto, and an ultraviolet ray may also be provided in another embodiment. For example, when heat is provided, heat of about 120-180 degrees Celsius (C) is provided for at least about 20 minutes, such that the coating composition CP may be cured. In addition, when an ultraviolet ray is provided, the energy of about 800-1,000 microjoules (mJ) is provided, such that the coating composition CP may be cured.

Figure 7D:
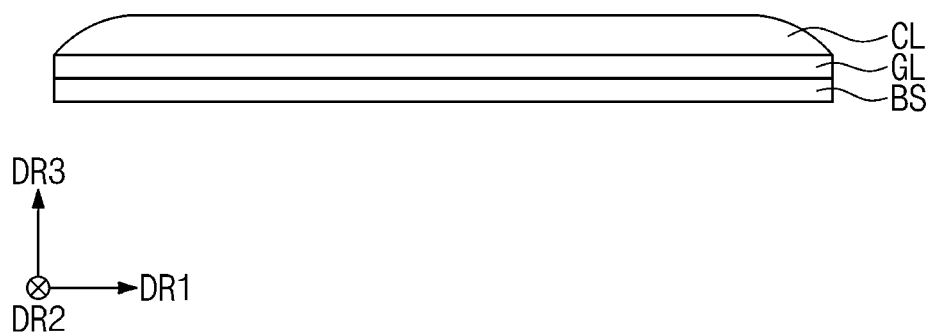

Referring to FIG. 7D, the coating composition CP is cured and then transformed to the coating layer CL according to the exemplary embodiment. The coating layer CL may have a shape such as that described above in the curing step without undergoing a particular step. In the case of a window composed of only a glass layer, a processing process is separately required in order to have the similar shape to the coating layer CL, but the window manufacturing method in this embodiment may achieve cost reduction and improve a yield because such a processing process can be omitted.

A window and an electronic device including the same according to an exemplary embodiment may achieve the reduction of weight and size by including a high hardness coating layer. In addition, a window and an electronic device including the same according to an exemplary embodiment also has a low manufacturing cost and thus has very excellent economic feasibility.

A window manufacturing method according to an exemplary embodiment may have a low manufacturing cost and an improved yield.

So far, the inventive concept has been described with reference to preferred exemplary embodiments. However, it will be understood by those skilled in the art that various modifications and variations can be made in the present invention without departing from the spirit and technical area of the present invention be set forth in claims.

Hence, the real protective scope of the present invention shall be determined by the technical scope of the accompanying claims.

What is claimed is:

1. A window comprising;
a coating layer divided into a first region and a second region, wherein the first region includes a center portion of the coating layer in a cross-sectional view, the second region includes an edge portion of the coating layer in the cross-sectional view, the first region is directly connected to the second region, a rear surface of the coating layer is flat in an entirety of the first region and an entirety of the second region, a front surface of the coating layer is flat in the entirety of the first region, the rear surface and the front surface of the coating layer are outermost surfaces of the coating layer, in the entirety of the first region the first region has a constant distance between the flat front surface and the flat rear surface in a thickness direction, and in the second region a distance between the front surface and the flat rear surface gradually reduces from the constant distance in a direction away from the first region; and
a bezel layer disposed on the rear surface of the coating layer, configured to absorb incident light, and overlapping the second region, not the first region in the thickness direction,
wherein the coating layer comprises inorganic particles, an acrylate resin, and an epoxy resin.

2. The window of claim 1, wherein the inorganic particles are at least one among $SiO_2$, $Al_2O_3$, $TiO_2$ $Li_2O_3$, $Na_2O$, or $ZrO_2$.

3. The window of claim 2, wherein the inorganic particles are included in the coating layer in an amount of about 1 percent by weight (wt %) to about 10 wt % with respect to the coating layer.

4. The window of claim 1, wherein the constant distance between the front surface and the rear surface in the first region is about 10 micrometers (μm) to about 1,000 μm.

5. The window of claim 1, wherein the coating layer has a pencil hardness of about 6 hardness (H) to about 9H.

6. The window of claim 1, the window further comprising:
a glass layer disposed between the bezel layer and the coating layer.

7. The window of claim 6, wherein
a thickness of the glass layer is about 10 μm to about 300 μm, and
the constant distance in the first region of the coating layer is about 10 μm to about 700 μm.

8. The window of claim 1, the window further comprising:
a functional layer between the coating layer and the bezel layer,
wherein the functional layer comprises a repeated pattern having a shape of a hairline, a lattice, or a polygon.

9. An electronic device comprising:
an electronic panel comprising a display region parallel to a plane defined by a first direction and a second direction crossing the first direction and a non-display region surrounding the display region; and
a window disposed on the electronic panel,
wherein the window comprises:
a coating layer divided into a first region parallel to the plane, including a center portion of the coating layer in the first direction and overlapping the display region in a plan view, and a second region overlapping the non-display region, directly connected to the first region, and having an outer, curved surface; and
a bezel layer disposed under the second region, not the first region, and configured to absorb incident light,
wherein the coating layer includes inorganic particles, an acrylate resin, and an epoxy resin,
wherein a front surface of the first region has a constant height in a direction perpendicular to the plane in the entirety of the first region, and
a front surface of the second region has a height which gradually decreases from the constant height toward the first direction or the second direction,
wherein the height of the front surface of the first region and the height of the front surface of the second region are measured from a same flat rear surface of the coating layer, and
wherein the front surface of the first region and the front surface of the second region are an outermost surface of the electronic device.

10. The electronic device of claim 9, wherein a thickness of the first region is about 10 μm to about 1,000 μm in the direction perpendicular to the plane.

11. The electronic device of claim 9, wherein the window further comprises:
a glass layer disposed between the coating layer and the bezel layer,
wherein a thickness of the glass layer in the direction perpendicular to the plane is about 10 μm to about 300 μm.

12. The electronic device of claim 9, wherein the window further comprises:
a functional layer between the coating layer and the bezel layer,
wherein the functional layer has a repeated pattern having a shape of a hairline, a lattice, or a polygon.

* * * * *